(12) United States Patent
Vyas et al.

(10) Patent No.: US 8,535,200 B2
(45) Date of Patent: Sep. 17, 2013

(54) VEHICLE PROPULSION SYSTEM HAVING A CONTINUOUSLY VARIABLE TRANSMISSION AND METHOD OF MAKING SAME

(75) Inventors: Parag Vyas, Munich (DE); Yaru Mendez Hernandez, Munich (DE); Alexander Felix Fiseni, Munich (DE)

(73) Assignee: General Electric Company, Schenectady, NY (US)

( * ) Notice: Subject to any disclaimer, the term of this patent is extended or adjusted under 35 U.S.C. 154(b) by 1053 days.

(21) Appl. No.: 12/405,874

(22) Filed: Mar. 17, 2009

(65) Prior Publication Data

US 2010/0240492 A1 Sep. 23, 2010

(51) Int. Cl.
*B60K 1/02* (2006.01)

(52) U.S. Cl.
USPC .................. 477/3; 180/65.265; 903/915

(58) Field of Classification Search
USPC ............ 180/65.265, 65.285, 65.28; 477/3; 475/5
See application file for complete search history.

(56) References Cited

U.S. PATENT DOCUMENTS

| | | | |
|---|---|---|---|
| 3,719,888 A | 3/1973 | Sampey | |
| 4,740,898 A | 4/1988 | McKee et al. | |
| 4,756,211 A | 7/1988 | Fellows | |
| 4,872,371 A | 10/1989 | Fellows | |
| 4,922,788 A | 5/1990 | Greenwood | |
| 5,217,418 A | 6/1993 | Fellows et al. | |
| 5,487,005 A | 1/1996 | Genise | |
| 5,495,912 A * | 3/1996 | Gray et al. | 180/165 |
| 5,521,819 A | 5/1996 | Greenwood | |
| 5,564,993 A | 10/1996 | Robinson | |
| 5,564,998 A | 10/1996 | Fellows | |
| 5,643,121 A | 7/1997 | Greenwood et al. | |
| 5,667,456 A | 9/1997 | Fellows | |
| 5,766,105 A | 6/1998 | Fellows et al. | |
| 5,789,882 A | 8/1998 | Ibaraki et al. | |
| 5,820,513 A | 10/1998 | Greenwood | |
| 5,895,337 A | 4/1999 | Fellows et al. | |
| 6,007,443 A | 12/1999 | Onimaru et al. | |
| 6,030,310 A | 2/2000 | Greenwood et al. | |
| 6,048,289 A * | 4/2000 | Hattori et al. | 477/15 |
| 6,053,833 A * | 4/2000 | Masaki | 475/2 |
| 6,054,844 A * | 4/2000 | Frank | 322/16 |
| 6,083,138 A * | 7/2000 | Aoyama et al. | 477/5 |

(Continued)

FOREIGN PATENT DOCUMENTS

EP 0572279 A2 12/1993

OTHER PUBLICATIONS

Bonsen, "Efficiency optimization of the push-belt CVT by variator slip control," Thesis, 2006.

(Continued)

*Primary Examiner* — Jeffrey J Restifo
(74) *Attorney, Agent, or Firm* — Ziolkowski Patent Solutions Group, SC; Jean K. Testa

(57) ABSTRACT

A vehicle propulsion system includes an electric machine (EM) configured to generate an unconditioned output. The vehicle propulsion system also includes a continuously variable transmission (CVT) having an input side and an output side, the input side mechanically coupled to the EM and configured to receive the unconditioned output from the EM and produce a conditioned output on the output side. A fixed-ratio transmission is mechanically coupled to the output side of the CVT and configured to receive the conditioned output from the CVT and produce a reconditioned output.

26 Claims, 3 Drawing Sheets

(56) References Cited

U.S. PATENT DOCUMENTS

| | | | | |
|---|---|---|---|---|
| 6,083,139 A | * | 7/2000 | Deguchi et al. | 477/5 |
| 6,098,733 A | | 8/2000 | Ibaraki et al. | |
| 6,110,066 A | | 8/2000 | Nedungadi et al. | |
| 6,146,302 A | * | 11/2000 | Kashiwase | 475/5 |
| 6,177,773 B1 | * | 1/2001 | Nakano et al. | 318/376 |
| 6,233,508 B1 | * | 5/2001 | Deguchi et al. | 701/22 |
| 6,278,915 B1 | * | 8/2001 | Deguchi et al. | 701/22 |
| 6,301,529 B1 | * | 10/2001 | Itoyama et al. | 701/22 |
| 6,312,356 B1 | | 11/2001 | Greenwood | |
| 6,314,346 B1 | * | 11/2001 | Kitajima et al. | 701/22 |
| 6,341,584 B1 | * | 1/2002 | Itoyama et al. | 123/90.15 |
| 6,343,252 B1 | * | 1/2002 | Asami et al. | 701/113 |
| 6,344,008 B1 | * | 2/2002 | Nagano et al. | 475/1 |
| 6,359,404 B1 | * | 3/2002 | Sugiyama et al. | 318/432 |
| 6,383,106 B1 | * | 5/2002 | Kashiwase | 475/5 |
| 6,409,623 B1 | * | 6/2002 | Hoshiya et al. | 475/5 |
| 6,427,793 B1 | * | 8/2002 | Hanada et al. | 180/65.25 |
| 6,434,928 B1 | * | 8/2002 | Manaka | 60/274 |
| 6,464,614 B2 | | 10/2002 | Dutson | |
| 6,484,833 B1 | | 11/2002 | Chhaya et al. | |
| 6,579,206 B2 | | 6/2003 | Liu et al. | |
| 6,602,157 B2 | * | 8/2003 | Kashiwase | 475/5 |
| 6,616,570 B2 | * | 9/2003 | Wakashiro et al. | 477/5 |
| 6,651,436 B2 | * | 11/2003 | Izumiura et al. | 60/708 |
| 6,662,096 B2 | * | 12/2003 | Komiyama et al. | 701/54 |
| 6,687,603 B2 | * | 2/2004 | Wakashiro et al. | 701/110 |
| 6,724,100 B1 | | 4/2004 | Gabriel | |
| 6,736,753 B2 | * | 5/2004 | Endo et al. | 477/3 |
| 6,809,429 B1 | * | 10/2004 | Frank | 290/40 C |
| 6,901,751 B2 | | 6/2005 | Bunting et al. | |
| 6,902,512 B2 | * | 6/2005 | Kamichi et al. | 477/108 |
| 6,934,610 B2 | * | 8/2005 | Wakashiro et al. | 701/22 |
| 6,971,969 B2 | * | 12/2005 | Kitagawa et al. | 477/3 |
| 6,979,276 B2 | | 12/2005 | Murray | |
| 7,007,464 B1 | * | 3/2006 | Asami et al. | 60/300 |
| 7,160,226 B2 | | 1/2007 | Fuller | |
| 7,246,672 B2 | * | 7/2007 | Shirai et al. | 180/65.25 |
| 7,273,120 B2 | * | 9/2007 | Tabata | 180/65.265 |
| 7,273,433 B1 | | 9/2007 | Troester | |
| 7,325,638 B1 | * | 2/2008 | Belloso | 180/69.6 |
| 7,407,459 B2 | | 8/2008 | Greenwood et al. | |
| 7,637,836 B2 | * | 12/2009 | Watanabe et al. | 475/210 |
| 7,736,266 B2 | * | 6/2010 | Huang et al. | 477/3 |
| 7,784,574 B2 | * | 8/2010 | Shirazawa et al. | 180/65.265 |
| 7,819,212 B2 | * | 10/2010 | Kawasaki | 180/65.265 |
| 7,822,524 B2 | * | 10/2010 | Tabata et al. | 701/53 |
| 7,848,858 B2 | * | 12/2010 | Tabata et al. | 701/22 |
| 7,908,067 B2 | * | 3/2011 | Soliman et al. | 701/54 |
| 7,909,728 B2 | * | 3/2011 | Tabata et al. | 477/3 |
| 7,988,579 B2 | * | 8/2011 | Tabata et al. | 475/5 |
| 8,016,717 B2 | * | 9/2011 | Ebner et al. | 477/3 |
| 8,033,939 B2 | * | 10/2011 | Tabata et al. | 475/5 |
| 2007/0042856 A1 | | 2/2007 | Greenwood | |
| 2007/0050118 A1 | | 3/2007 | Murray | |
| 2007/0072736 A1 | | 3/2007 | Defreitas et al. | |
| 2008/0146399 A1 | | 6/2008 | Oliver et al. | |
| 2008/0153659 A1 | | 6/2008 | Greenwood | |
| 2008/0269001 A1 | | 10/2008 | Greenwood et al. | |

OTHER PUBLICATIONS

Torotrak, IVT for hybrid electric vehicles, Benefits for hybrids, 2008, http://www.torotrak.com/hybrids.

* cited by examiner

VEHICLE PROPULSION SYSTEM HAVING A CONTINUOUSLY VARIABLE TRANSMISSION AND METHOD OF MAKING SAME

BACKGROUND OF THE INVENTION

The invention relates generally to electric and hybrid vehicles, and more specifically to a vehicle propulsion system having a continuously variable transmission (CVT).

As is known in the art, CVTs are capable of continuously or steplessly varying the speed of rotation of an output shaft over a range of operating speeds while a high speed or input shaft rotates. CVTs may be used in automotive applications as a substitute for conventional fixed-ratio transmissions or multi-geared automatic transmission systems. CVTs have an advantage over conventional transmissions because of their large and "continuous" transmission ratio coverage, which may range from 1:10 to 1:20 for example. In order to achieve this large range of gear ratios, such CVTs tend to be large and technically complex and are therefore expensive to manufacture. CVTs are typically less efficient than conventional gearboxes due to additional friction between the input and output shafts, and the costs and inefficiencies increase with size. However, CVTs typically lessen noticeable shifting events, provide a smoother and more comfortable ride because of continuous traction torque, and allow an operation point of the traction engine to shift to more economic operating points, thus increasing fuel efficiency of the engine compared with vehicles equipped with fixed-gear, automatic transmissions.

It would therefore be desirable to design a vehicle propulsion system that incorporates a CVT while reducing the size, cost, and inefficiencies typically associated with CVTs.

BRIEF DESCRIPTION OF THE INVENTION

According to an aspect of the invention, vehicle propulsion system includes an electric machine (EM) configured to generate an unconditioned output. The vehicle propulsion system also includes a continuously variable transmission (CVT) having an input side and an output side, the input side mechanically coupled to the EM and configured to receive the unconditioned output from the EM and produce a conditioned output on the output side. A fixed-ratio transmission is mechanically coupled to the output side of the CVT and configured to receive the conditioned output from the CVT and produce a reconditioned output.

In accordance with another aspect of the invention, a vehicle includes a vehicle propulsion system. The vehicle propulsion system includes a vehicle traction system and an electromechanical device configured to produce an unconditioned output. The vehicle propulsion system also includes a continuously variable transmission (CVT) having an input side and an output side, the input side mechanically coupled to the electromechanical device and configured to receive the unconditioned output and output a conditioned output on the output side and a fixed-ratio transmission attached to the output side of the CVT. The fixed-ratio transmission is configured to receive the conditioned output from the CVT and deliver a desired vehicle propulsion system output to the vehicle traction system.

According to yet another aspect of the invention, a method of fabricating a vehicle power system includes coupling an output of an electric motor (EM) to an input side of a continuously variable transmission (CVT) and coupling a fixed transmission to an output side of the CVT. The method further includes coupling the fixed transmission to a vehicle traction system, the fixed transmission configured to modify an output of the CVT and deliver the modified CVT output to the vehicle traction system.

Various other features and advantages will be made apparent from the following detailed description and the drawings.

BRIEF DESCRIPTION OF THE DRAWINGS

The drawings illustrate embodiments presently contemplated for carrying out the invention.

In the drawings.

DETAILED DESCRIPTION

Figure 1:
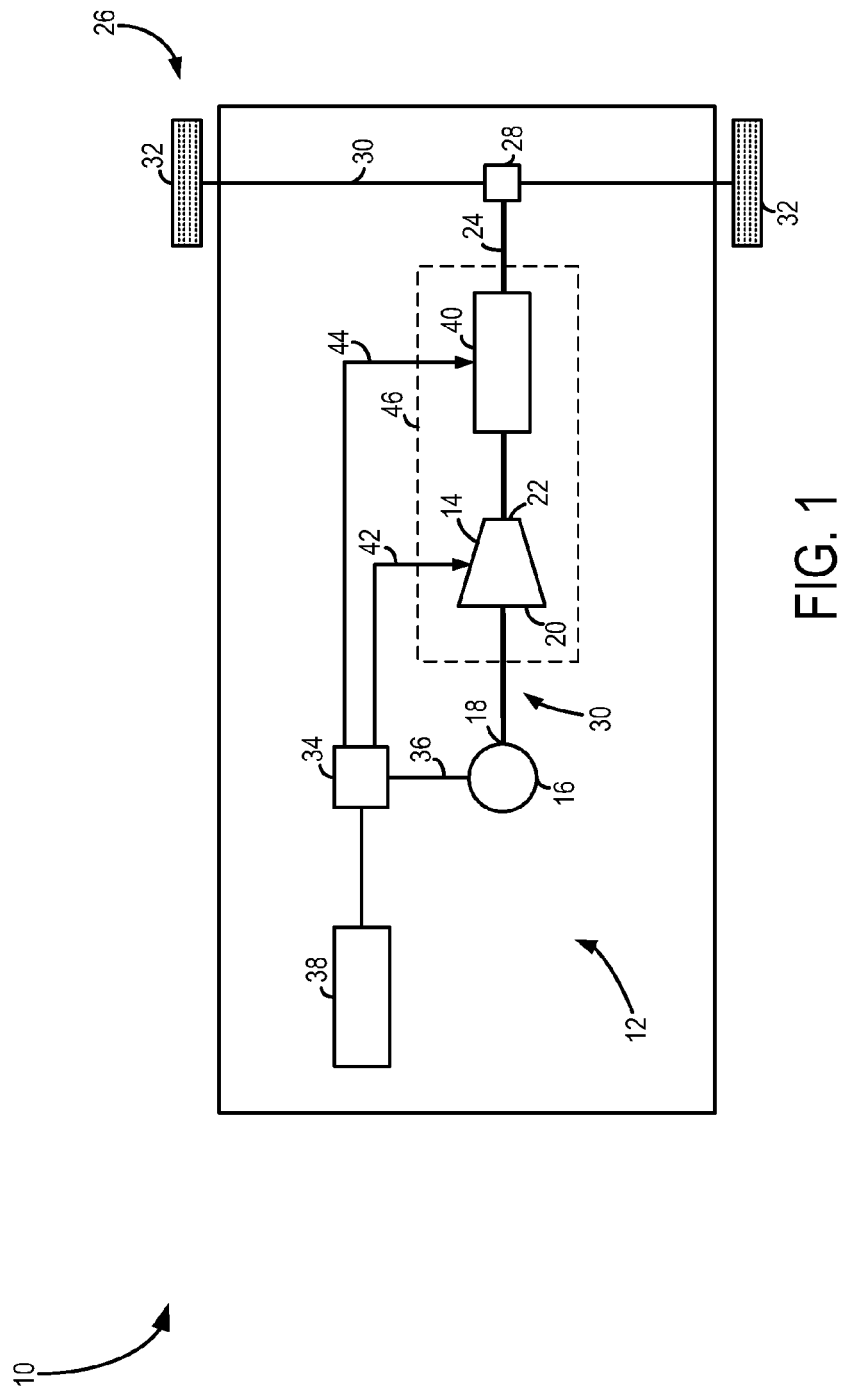
FIG. 1 is a schematic diagram of a vehicle propulsion system according to an embodiment of the invention.
Figure 2:
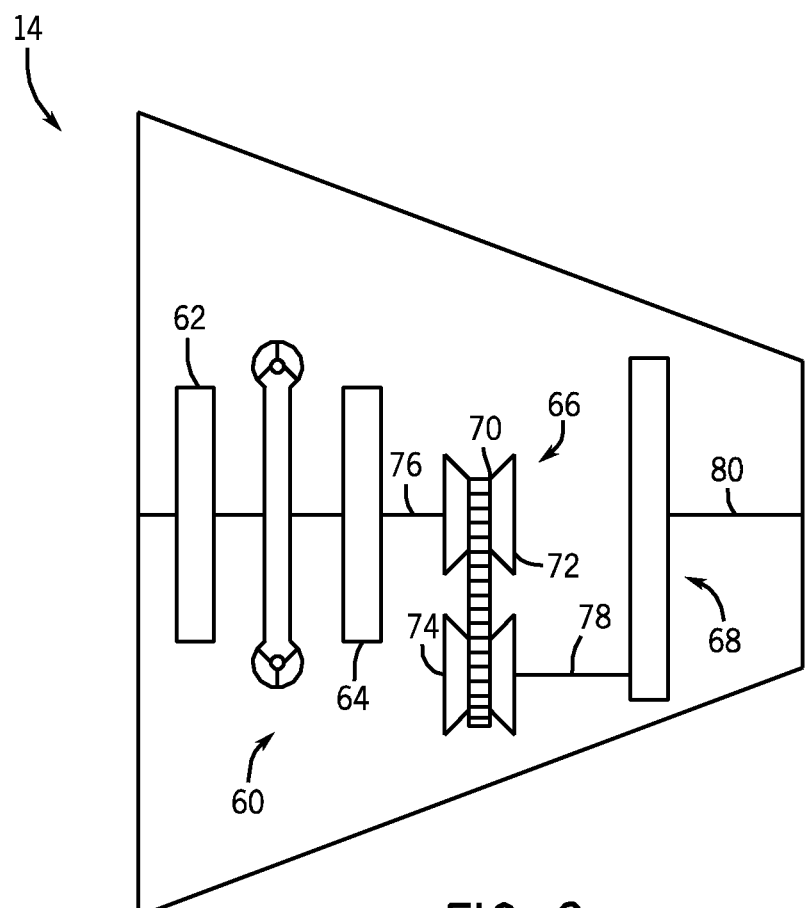
FIG. 2 is a schematic diagram of a CVT as known in the art.

FIG. 1 illustrates an embodiment of the invention and includes a schematic of a vehicle 10 having vehicle propulsion system 12 that incorporates a CVT 14, an exemplary embodiment of which is described with respect to FIG. 2. While a belt-driven CVT is described herein, one skilled in the art will recognize that the invention is equally applicable to any type of CVT such as, for example, a torodially-driven CVT. Vehicle propulsion system 12 includes an electromechanical device or electric machine (EM) 16 that produces an unconditioned output. That is, EM 16 produces an output power capable of propelling vehicle 10 via vehicle propulsion system 12 and, because of the dual requirements of high torque capability at low speed and high speed output at cruising speed, it is desirable to further condition the power output from EM 16 to best meet the overall needs of vehicle propulsion system 12.

Thus, an output 18 of EM 16 is coupled to an input side or high speed side 20 of CVT 14. An output side or low speed side 22 of CVT 14 is coupled to an input 24 of a vehicle traction system 26, which includes a differential 28 connecting a drive shaft 30 to wheels 32. Vehicle propulsion system 12 also includes a bidirectional controller/power convertor 34, which is electrically coupled to EM 16 via a power bus 36. Bidirectional controller 34 includes an internal memory (not shown) that is programmed to selectively operate vehicle propulsion system 12. Specifically, bidirectional controller 34 selectively transmits power between EM 16 and a battery storage unit 38 to respectively power EM 16 or to charge battery storage unit 38, as needed. For example, bidirectional controller 34 may permit recharging of battery storage unit 38 during regenerative braking. In another embodiment, bidirectional controller 34 is configured to draw power from an electrical grid (not shown), such as in a "plug-in" electric vehicle, to recharge battery storage unit 38. During vehicle operation, bidirectional controller 34 may also transmit command signals to CVT 14 and a fixed-ratio transmission 40 via control lines 42, 44, respectively, as described in detail below.

In one embodiment, CVT 14 may include a gear range of, for example, 1:10-1:20 or any other gear relation or ratio, depending on the design and torque requirements. However, according to an exemplary embodiment of the invention, vehicle propulsion system 12 may include a hybrid transmission 46, comprising CVT 14 and a fixed-ratio transmission 40. Fixed-ratio transmission 40 is positioned between output side 22 of CVT 14 and vehicle traction system 26 and typically reconfigures, modifies, or reconditions a power output of EM 16. Fixed-ratio transmission 40 may include a single fixed gear ratio, for example 1:10, or may be configured with several selectable fixed gear ratios, for example, 1:1, 1:2, and 1:10. The inclusion of a fixed-ratio transmission, such as transmission 40 having a 1:10 ratio, in conjunction with CVT 14, thus enables CVT 14 to carry a portion of the gear ratio requirements, such as 1:1-1:2, and transmission 40 can thus carry the remainder of the gear ratio requirements. As such, in combination, CVT 14 and fixed-ratio transmission 40 may obtain an effective gear ratio range of 1:10-1:20, which improves overall efficiency by introducing a more efficient fixed-ratio transmission 40 and enabling CVT 14 to be more compact and, thus, less costly than a stand-alone CVT that would carry the entire gear ratio range of 1:10-1:20.

In operation, the equivalent gear ratio of hybrid transmission 46 for startup is set at a higher fixed gear ratio than the startup gear ratio of a conventional fixed-ratio transmission. As is known in the art, when selecting an EM for use in a particular system, the size (i.e., power rating) of the EM may be based on a maximum torque desired of the EM by the system. However, by coupling hybrid transmission 46 to the output 18 of EM 16, hybrid transmission 46 may be used to condition the output of EM 16 at startup by increasing or maximizing torque output thereof. Thus, when used in conjunction with hybrid transmission 46, the size and/or power rating of EM 16 may be reduced when compared with an EM that alone would provide the same startup torque. Thus, the cost and/or overall dimensions of vehicle propulsion system 12 may be reduced.

During vehicle operation, once output shaft 18 of EM 16 reaches a desired EM operating speed, controller 34 selectively supplies EM 16 with a given operating voltage and/or current via power bus 36 to maintain EM 16 at the desired EM operating speed and to produce a constant output to be delivered to hybrid transmission 46. By controlling EM 16 in this manner, an operating efficiency of the EM 16 is improved. Controller 34 then monitors real-time vehicle operating conditions to determine a desired propulsion system output to be delivered to the vehicle traction system 26. For example, controller 34 may be programmed to monitor a real-time vehicle acceleration requirement to determine a desired torque output of vehicle propulsion system 12.

Based on the desired propulsion system output, controller 34 operates EM 16 and hybrid transmission 46 to produce and deliver a conditioned output to vehicle propulsion system 12. First, controller 34 selectively operates CVT 14 to condition an output from EM 16 and deliver a conditioned output to fixed-ratio transmission 40. CVT 14 operates within a continuous range of gear ratios, such as, for example, between 1:2 and 1:1, to condition the output from EM 16 and produce a variable torque and speed output as needed for acceleration of vehicle traction system 26. Controller 34 may, for example, operate CVT 48 within a desired gear-ratio range that maximizes an operating efficiency of the CVT 48 and/or the vehicle propulsion system 50. Controller 34 may be further programmed to selectively control the effective gear ratio of hybrid transmission 46 and, therefore, condition the output of EM 16 according to an operator-selected performance mode such as a "sport mode" that maximizes acceleration performance or such as an "economy mode" that minimizes power consumption of vehicle propulsion system 12 to increase battery life and/or minimize fuel consumption.

Controller 34 operates fixed ratio transmission 40 to recondition the output from CVT 14 and deliver the reconditioned output to differential 28 of vehicle traction system 26. Controller 34 selects a combined gear ratio for CVT 14 and fixed-ratio transmission 40 such that the reconditioned output meets the desired propulsion system output. For example, if fixed-ratio transmission 40 is configured with a 1:10 gear ratio and controller 34 determines that a 1:20 ratio is needed to meet the desired propulsion system output, controller 34 will operate the CVT 14 at a gear ratio of 1:2. The gear ratio of CVT 14 may be adjusted (e.g., between 1:1 and 1:2) to meet any changes in an instantaneous acceleration requirement. Because the conditioned output of CVT 14 is reconditioned by fixed-ratio transmission 40 to produce the desired propulsion system output, hybrid transmission 46 allows CVT 14 to be operated at a lower gear ratio than a stand-alone CVT, allowing for a smaller, less complex, and less expensive CVT unit. Furthermore, use of hybrid transmission 46 minimizes the frictional inefficiencies inherent in a stand-alone CVT. By coupling fixed-ratio transmission 40 to the output of CVT 14, CVT 14 may be locked at an optimal fixed gear ratio when the vehicle is cruising.

FIG. 2 illustrates a known embodiment of a CVT 14. CVT 14 includes several main components: a launching device 60, an actuation system 62, a drive-neutral-reverse (DNR) set 64, a variator 66, and an output gearing 68. Launching device 60 typically includes a torque converter, which is used at vehicle startup. After vehicle startup, the torque converter may be locked by engaging an internal clutch. The DNR set 64 enables a vehicle to be shifted between neutral, forward, and reverse. DNR set 64 typically includes a planetary gear set and a set of clutches, which are selectively engaged to shift the vehicle between forward and reverse, and selectively disengaged to place the transmission in neutral. Variator 66 comprises a belt 70 clamped between two pairs of conical sheaves 72, 74 with one pair of sheaves 72 mounted on an input 76 of variator 66 and the other pair of sheaves 74 mounted on an output 78 of variator 66. Although a belt-driven variator is described herein, one skilled in the art will recognize that CVT 14 may alternatively comprise another type of variator design such as, for example, a toroidal, roller-based, or hydrostatic design.

The gear ratio of CVT 14 is determined by adjusting the distance between each pair of sheaves 72, 74. The actuation system 62 typically uses hydraulics to set and maintain the desired gear ratio. To transmit the CVT output to a vehicle traction system, output gearing 68, for example, an elliptical gearset, is positioned between output 78 of variator 66 and an output 80 of CVT 14. In operation, CVT 14 is able to condition an input power by selectively varying the gear ratio of CVT 14, thus producing an output having an altered torque.

Figure 3:
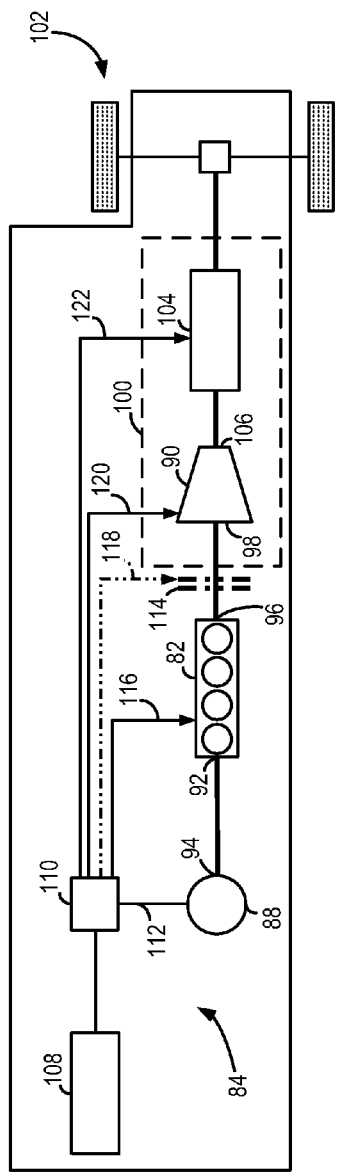
FIG. 3 is a schematic diagram of a vehicle propulsion system according to another embodiment of the invention.

FIG. 3 illustrates another embodiment of the invention, incorporating an internal combustion engine (ICE) 82 into a vehicle propulsion system 84 of a vehicle 86. ICE 82 is positioned between an EM 88 and a CVT 90, which may be a CVT such as CVT 14 of FIG. 2. An input side 92 of ICE 82 is coupled to an output side 94 of EM 88, and an output side 96 of ICE 82 coupled to a high speed or input side 98 of CVT 90. A transmission 100 is coupled to a vehicle traction system 102 and includes CVT 90 and a fixed-ratio transmission 104, which may be coupled to a low speed side or output side 106 of CVT 90. A battery storage unit 108 and a bidirectional controller/converter 110 are coupled to EM 88 via a power bus 112. Optionally, a mechanical bypass or clutch 114 (shown in phantom) may be positioned between ICE 82 and CVT 90, allowing ICE 82 to be used to charge battery storage unit 108 without delivering power to the CVT 90. Additionally, clutch 114 allows ICE 82 and EM 88 to be disconnected from vehicle traction system 102 to minimize frictional losses. Bidirectional controller 110 is connected via control lines 116, 118, 120 to selectively operate ICE 82, optional clutch 114 and CVT 90. In one embodiment, bidirectional controller 110 is configured to selectively operate fixed-ratio transmission 104 via control line 122. During vehicle operation, controller 110 selectively controls EM 88, ICE 82, and transmission 100 to optimize vehicle operation. Specifically, controller 110 monitors real-time vehicle operation conditions and driver inputs to determine a desired propulsion system output to be delivered to vehicle traction system 102. Controller 110 operates ICE 82 within a desired speed range, which may be a narrower range of speeds than the range of operating speeds for a similar ICE operating as a stand-alone unit. By selectively controlling the operating speed of ICE 82, ICE 82 may be operated within a range of speeds that minimizes fuel consumption.

Transmission 100 is operated to condition the output from ICE 82. Specifically, controller 110 operates CVT 90 and fixed-ratio transmission 104 together to achieve the instantaneous gear ratio needed to produce the desired propulsion system output, as described above, thus increasing the efficiency of transmission 100 and allowing for a smaller and less complex CVT unit.

Controller 110 also continuously monitors actual output of vehicle propulsion system 84 versus desired real-time vehicle propulsion system output to determine if any additional output is needed from vehicle propulsion system 84. If additional output (e.g., increased torque or increased output speed) is needed, controller 110 selectively operates EM 88 and/or transmission 100 to produce the additional output, which may include power from EM 88 to add additional boost to ICE 82. Controller 110 may also be programmed to monitor for transient changes in the instantaneous or real-time output requirement due to, for example, an acceleration increase or change in road topology. Based on any changes in the real-time propulsion system output requirement, EM 88 may be selectively controlled to increase rotational speed or output torque and, thus, provide the additional output to meet the real-time output requirement.

When EM 88 is not operating to provide transient response torque, the rotating mass of EM 88 may be used for energy storage by acting as a generator. Alternatively, controller 110 may engage or disengage optional clutch 114 (shown in phantom) between ICE 82 and CVT 90 to direct the output of ICE 82 to battery storage unit 108 to be used to charge battery storage unit 108, as needed. If no additional battery charge is needed, controller 110 may shut down ICE 82 to allow for electric drive of vehicle propulsion system 84. Additionally, controller 110 may selectively shut down ICE 82 and operate EM 88 and transmission 100 together, as explained with respect to FIG. 1, to produce a desired vehicle propulsion system output based on a user-selected operation mode.

Figure 4:
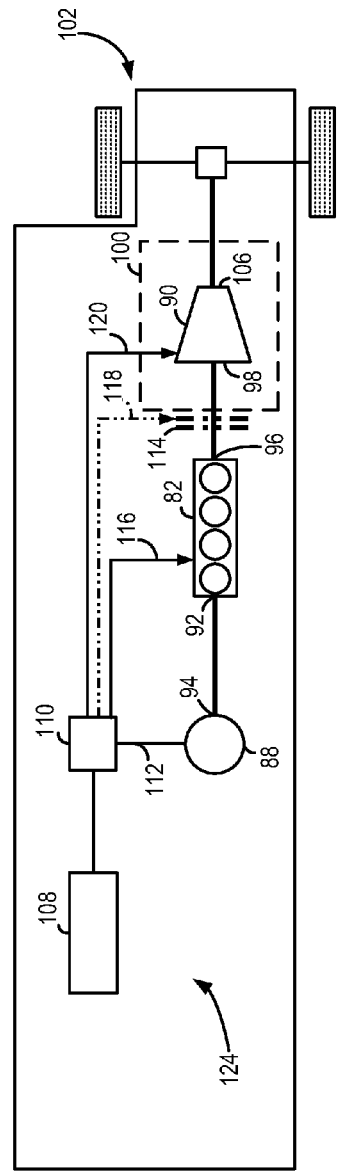
FIG. 4 is a schematic diagram of a vehicle propulsion system according to another embodiment of the invention.

FIG. 4 illustrates another embodiment of the invention, similar to vehicle propulsion system 84 illustrated in FIG. 3, but wherein transmission 100 does not include a fixed-ratio transmission. Thus, in vehicle propulsion system 124, controller 110 operates CVT 90 to selectively amplify the torque output from ICE 82 and deliver the conditioned output to vehicle traction system 102. As such, ICE 82 and transmission 100 may be controlled together to deliver the same output torque as a larger stand-alone ICE with a higher power rating. In a similar manner, hybrid transmission 46 of vehicle propulsion system 10 of FIG. 1 may be configured without fixed-ratio transmission 40, and CVT 14 may be controlled to deliver a desired propulsion system output directly to vehicle traction system 26.

Thus, the above-described figures illustrate embodiments of a vehicle propulsion system that maximize the advantages of a CVT operating with an EM or hybrid EM/ICE combination. In one embodiment, output of an EM is delivered to the input side of a CVT. The CVT conditions the EM output, producing an increased torque output that allows the vehicle propulsion system to be designed with a smaller EM. The CVT delivers the conditioned output to a fixed-ratio transmission, which is coupled to the output side of the CVT. The fixed-ratio transmission reconditions (i.e., further modifies) the output from the CVT, thus producing the desired vehicle propulsion system output while allowing the vehicle propulsions system to be designed with a smaller, less expensive CVT and minimizing the frictional losses inherent in a CVT.

In another embodiment, an ICE is positioned between the output of an EM and the input side of a CVT. The ICE is operated to maximize operating efficiency while the EM is operated, as needed, to produce additional power. The CVT is operated to condition the output of the ICE and EM and produces an increased torque output, which allows the system to be designed with a smaller, less costly ICE and/or EM. Optionally, the CVT delivers the conditioned output to a fixed-ratio transmission, which operates as described above and reconditions the output from the ICE and EM, allowing the vehicle propulsion system to be designed with a smaller, less complex, and more efficient CVT.

A technical contribution for the disclosed method and apparatus is that it provides for a controller-implemented technique for operating a vehicle propulsion system having a CVT.

According to one embodiment of the invention, a vehicle propulsion system includes an electric machine (EM) configured to generate an unconditioned output. The vehicle propulsion system also includes a continuously variable transmission (CVT) having an input side and an output side, the input side mechanically coupled to the EM and configured to receive the unconditioned output from the EM and produce a conditioned output on the output side. A fixed-ratio transmission is mechanically coupled to the output side of the CVT and configured to receive the conditioned output from the CVT and produce a reconditioned output.

In accordance with another embodiment of the invention, a vehicle includes a vehicle propulsion system. The vehicle propulsion system includes a vehicle traction system and an electromechanical device configured to produce an unconditioned output. The vehicle propulsion system also includes a continuously variable transmission (CVT) having an input side and an output side, the input side mechanically coupled to the electromechanical device and configured to receive the unconditioned output and output a conditioned output on the output side and a fixed-ratio transmission attached to the output side of the CVT. The fixed-ratio transmission is configured to receive the conditioned output from the CVT and deliver a desired vehicle propulsion system output to the vehicle traction system.

In accordance with yet another embodiment of the invention, a method of fabricating a vehicle power system includes coupling an output of an electric motor (EM) to an input side of a continuously variable transmission (CVT) and coupling a fixed transmission to an output side of the CVT. The method further includes coupling the fixed transmission to a vehicle traction system, the fixed transmission configured to modify an output of the CVT and deliver the modified CVT output to the vehicle traction system.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A vehicle propulsion system comprising:
   an electric machine (EM) configured to generate an unconditioned output;
   a continuously variable transmission (CVT) having an input shaft and an output shaft, the input shaft mechanically coupled to the EM and configured to receive the unconditioned output from the EM and output a conditioned output on the output shaft; and
   a fixed-ratio transmission mechanically coupled to the output shaft of the CVT and configured to:
      receive the conditioned output from the CVT; and
      produce a reconditioned output; and
   wherein the fixed-ratio transmission is coupled to the CVT absent a geared connection between the CVT and the fixed-ratio transmission that bypasses the output shaft of the CVT.

2. The vehicle propulsion system of claim 1 wherein the fixed-ratio transmission is configured to deliver the reconditioned output to a vehicle traction system.

3. The vehicle propulsion system of claim 2 wherein the vehicle traction system comprises a differential coupled to an output of the fixed-ratio transmission.

4. The vehicle propulsion system of claim 2 wherein the vehicle traction system comprises a drive shaft and a plurality of wheels.

5. The vehicle propulsion system of claim 1 further comprising a battery storage unit electrically connected to the EM.

6. The vehicle propulsion system of claim 1 further comprising a bidirectional controller electrically connected to the EM and configured to determine a desired propulsion system output.

7. The vehicle propulsion system of claim 6 wherein the bidirectional controller is further configured to selectively operate at least one of the EM and the CVT based on the desired propulsion system output.

8. The vehicle propulsion system of claim 6 further comprising an internal combustion engine (ICE) mechanically connected between the EM and the input shaft of the CVT and configured to deliver an ICE output to the CVT.

9. The vehicle propulsion system of claim 8 wherein the bidirectional controller is further configured to selectively operate the CVT to condition the ICE output based on the desired propulsion system output.

10. The vehicle propulsion system of claim 8 further comprising a clutch positioned between the ICE and the input shaft of the CVT.

11. A vehicle having a vehicle propulsion system, the vehicle comprising:
    a vehicle traction system;
    an electro-mechanical device configured to produce an unconditioned output;
    a continuously variable transmission (CVT) having an input shaft and an output shaft, the input shaft directly coupled to an output of the electro-mechanical device and configured to receive the unconditioned output, condition the unconditioned output by transmitting the unconditioned output from a first pair of sheaves of the CVT to a second pair of sheaves of the CVT, and output a conditioned output on the output shaft; and
    a fixed-ratio transmission directly coupled to the output shaft of the CVT and configured to:
       receive the conditioned output from the CVT; and
       deliver a desired vehicle propulsion system output to the vehicle traction system; and
    wherein a distance between respective sheaves of the first and second pair of sheaves defines a gear ratio of the CVT.

12. The vehicle of claim 11 further comprising a controller configured to:
    operate the electro-mechanical device to produce the unconditioned output;
    monitor vehicle operating conditions to determine the desired propulsion system output;
    control the CVT to selectively condition the output from the electro-mechanical device; and
    control the fixed-ratio transmission to recondition the conditioned output from the CVT and generate the desired propulsion system output.

13. The vehicle of claim 12 wherein the controller is further configured to operate the fixed-ratio transmission to deliver the reconditioned output to a differential.

14. The vehicle of claim 12 wherein the controller is further configured to:
    operate the CVT at a fixed gear ratio for a first time period; and
    operate the CVT at a variable gear ratio for a second time period.

15. The vehicle of claim 14 wherein the controller is further configured to selectively adjust the variable gear ratio to achieve a desired output torque.

16. The vehicle of claim 14 wherein the controller is further configured operate the CVT at the fixed gear ratio until a rotational speed of the electro-mechanical device reaches a threshold speed.

17. The vehicle of claim 12 wherein the controller is further configured to selectively operate the electro-mechanical device to charge a battery storage unit.

18. The vehicle of claim 12 wherein the controller is further configured to selectively operate the CVT within a desired region of operation to maximize an operating efficiency of the vehicle propulsion system.

19. The vehicle of claim 12 wherein the controller is further configured to selectively operate an internal combustion engine (ICE) to produce an ICE output, the ICE positioned between the output of the electro-mechanical device and the input shaft of the CVT.

20. The vehicle of claim 19 wherein the controller is further configured to operate the ICE within an optimal speed range to maximize an operating efficiency of the ICE.

21. The vehicle of claim 19 wherein the controller is further configured to selectively disengage a mechanical bypass between the ICE and the CVT and operate the electro-mechanical device and the CVT to produce the desired propulsion system output.

22. The vehicle of claim 21 wherein the controller is further configured to operate the ICE to charge a battery storage unit.

23. A method of fabricating a vehicle power system comprising:
    coupling an output of an electric motor (EM) to a continuously variable transmission (CVT) having an input shaft and an output shaft;
    coupling a fixed transmission to the output shaft of the CVT and absent a geared connection between the fixed transmission and the input shaft of the CVT that bypasses the output shaft of the CVT; and coupling the fixed transmission to a vehicle traction system, the fixed transmission configured to modify an output of the CVT and deliver the modified CVT output to the vehicle traction system.

24. The method of claim 23 further comprising:

coupling an input of an internal combustion engine (ICE) to the output of the EM; and coupling an output of the ICE to the input shaft of the CVT.

25. The method of claim 24 further comprising:

coupling a battery storage unit to the ICE; and configuring the ICE to deliver an auxiliary power to the battery storage unit.

26. The method of claim 23 wherein coupling the fixed transmission to the vehicle traction system comprises coupling the fixed transmission to a differential.

* * * * *